June 5, 1956 P. KOURY ET AL 2,749,201

SLIDE STRUCTURE

Filed July 20, 1953 3 Sheets-Sheet 1

INVENTORS
PHILIP KOURY
RICHARD J. WILLS
BY Lyon & Lyon
ATTORNEYS

INVENTORS
PHILIP KOURY
RICHARD J. WILLS
BY
Lyon & Lyon
ATTORNEYS

INVENTORS
PHILIP KOURY
RICHARD J. WILLS
BY
Lyon & Lyon
ATTORNEYS 2,749,201

SLIDE STRUCTURE

Philip Koury, Los Angeles, and Richard J. Wills, Burbank, Calif., assignors to Brubaker Manufacturing Company, Inc., Los Angeles, Calif., a corporation of California Application July 20, 1953, Serial No. 369,032

5 Claims. (Cl. 312—323)

The present invention relates to an improved means and techniques whereby a component such as, for example, a chassis for radio equipment may be mounted in a cabinet or other similar structure from and into which said components may be conveniently moved; and, more specifically relates to an improved slide structure upon which such components may be conveniently mounted in different oriented positions for convenient accessibility.

In general, the present arrangement contemplates a slide structure which may be conveniently mounted on the inner spaced vertical walls of a cabinet with a pair of parallel extending slide members arranged to slide horizontally into and out of such cabinet. Such slide members are of unique construction in that a component, such as for example a chassis for radio equipment, may, in turn, be slidably mounted on such slide members and be maintained on such slide members in different oriented positions to allow convenient access to the various portions of the circuitry included on such chassis. Although the present invention is described specifically in relationship to a radio chassis, it is understood, of course, that the arrangement described and claimed herein may be used to support a component other than a radio chassis.

A general object, therefore, of the present invention is to provide an improved structure of the character outlined above.

Another object of the present invention is to provide an improved slide structure of this character which is sturdy, simple, and relatively inexpensive considering the various functions and results obtained.

A specific object of the present invention is to provide an arrangement of this character which serves to maintain the aforementioned component in any one of three extended positions as illustrated in Figures 7, 8 and 9, herein.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 illustrates a view in side elevation of the right-hand slide structure which is adapted to be mounted on an inner vertical wall of a cabinet, and without the component, i. e., radio chassis mounted thereon;

Figures 2, 3 and 4 are views taken generally in the direction indicated by the corresponding lines 2—2, 3—3 and 4—4 in Figure 1, it being noted that Figures 2, 3 and 4 also include a portion of the aforementioned cabinet wall;

For purposes of simplicity, the drawings herein illustrate the structure of only one of the pair of slide elements, the particular one which is illustrated being the right-hand slide element, and it is understood that the other slide element, namely, the left-hand slide element, is considered, in structure, to be a mirror image of the right-hand element which is now described in detail.

Figures 1, 2, 3, 4, 5, 10:
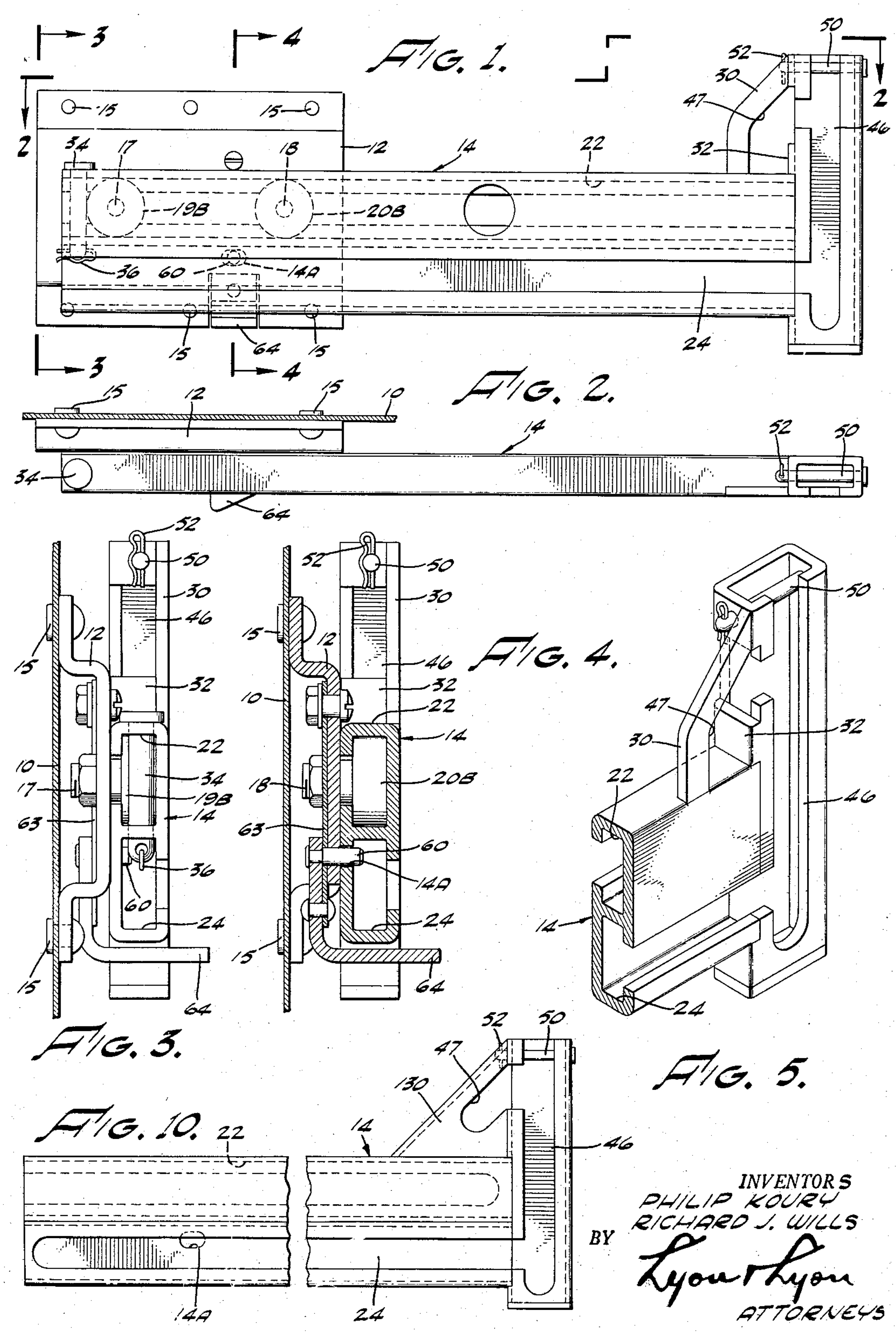
Figure 5 is a perspective view showing a portion of the slide structure illustrated in Figure 1.
Figure 10 is a view in side elevation, similar to the view in Figure 1, of a modified slide element.

The right-hand slide element and the left-hand slide element are each mounted on opposite inner vertical walls of the cabinet 10 to extend generally horizontally, such slide elements being mounted on such vertical walls by a corresponding so-called mounting pad as illustrated in Figure 3, with such pad 12, however, extending horizontally, as shown in Figure 1, only a fractional portion of the length of the slide element 14 illustrated therein. Each of the mounting pads 12 is mounted on a corresponding cabinet wall by six fastening elements such as rivets 15 as shown in Figure 3. Each of the mounting pads 12 has affixed thereto, two horizontally spaced axles 17, 18, which rotatably support corresponding rollers 19B and 20B.

These two rollers 19B, 20B on corresponding mounting pads 12 serve to support the corresponding right and left-hand slide elements 14 as well as the box-shaped component 20, i. e., radio chassis mounted on such right and left-hand slide elements.

In general, the slide element 14 comprises an elongated member having as illustrated in Figure 5, an outwardly extending upper flanged channel or trackway 22, for the aforementioned rollers 17, 18; a lower inwardly extending flanged channel or trackway 24 for accommodating the rollers 26 and 27 of the chassis 20; a vertically extending and inwardly disposed flanged channel or trackway 46 which is in communication with the horizontally extending trackway 24; and, in addition, there is the trackway 47 which is in communication with the upper end of the trackway 26 and which is defined by the 45° angle brace member 30 as well as the rear side of a portion of the flanged channel which defines the trackway 46. The aforementioned portion of such trackway has the reference numeral 32.

Normally, the rollers 19B and 20B are disposed in their trackway 22, but such slide 14 may be removed from the cabinet 10, if desired, by removing the clevis pin 34 (Figures 1 and 3) which normally serves to close the end of such trackway 22 and to thereby serve as a stop member, such clevis pin 34 being normally threaded through spaced apertures and carrying a conventional hairpin type of retaining spring 36.

Figures 6, 7, 8, 9:
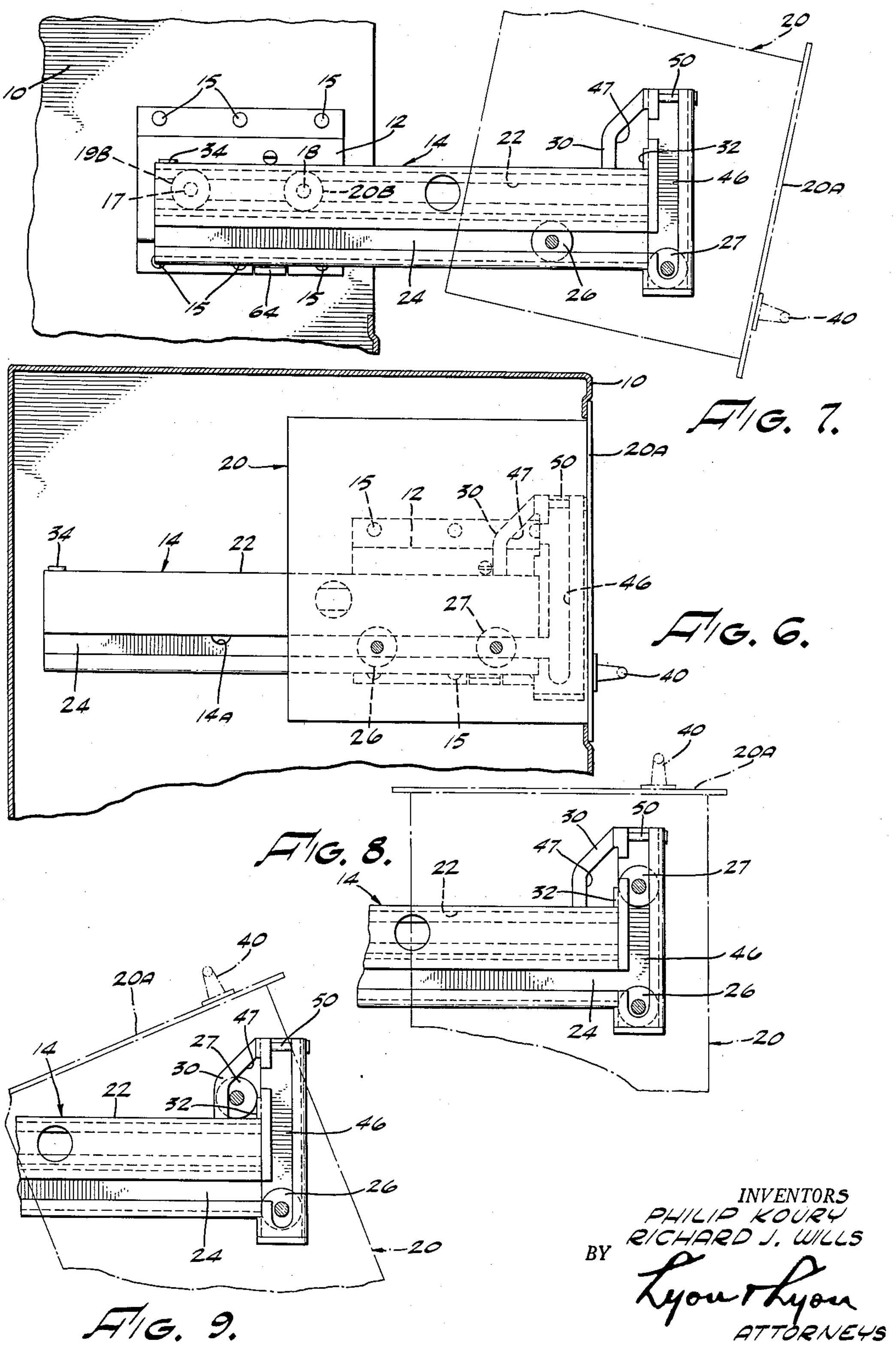
Figure 6 illustrates the slide structure in its retracted position within a cabinet, and with the radio chassis mounted thereon.
Figures 7, 8 and 9 illustrate three positions in which the radio chassis may be supported on the slide structure when such chassis and slide structure are moved outside the confines of the cabinet.

The component 20, which is generally box-shaped, has two spaced walls upon each of which is rotatably supported the horizontally disposed rollers 26 and 27 which, in the retracted position of the slide structure and chassis, are disposed in the horizontally extending lower trackway 24. As illustrated in Figure 6 wherein the front panel 20A of the component 20 is substantially flush with the vertically extending face of the cabinet 10 such front panel 20A has mounted thereon a conventional handle 40 which may be conveniently grasped for purposes of pulling such component 20 out of its retracted position illustrated in Figure 6 to a position indicated generally in Figure 7 wherein the forward chassis roller 27 is disposed in the vertically extending trackway 46. It is observed that the vertically extending trackway 46, while in communication with the horizontally extending trackway 24 extends below such trackway 24 so that when the handle of the component 20 is released the component 20 assumes the position illustrated in Figure 7. The effect of this is that the front panel 20A is inclined with respect to the vertical to allow more convenient access to elements carried by such component 20, also assuring a positive lock which prevents roller 27 from moving horizontally until chassis 20 is lifted vertically and roller 27 is placed in trackway 24.

Once extended, as illustrated in Figure 7, the component or chassis 20 may be moved manually to either one of the two self-supporting positions illustrated in Figures 8 and 9, or indeed, such chassis 20 may be completely removed from the slide elements by removing the removable pin 50 which serves generally as a stop member or closure for the upper end of the vertical channel 46. The pin 50 passes through spaced apertured portions of the trackway 46 and is normally retained by the hairpin type of retaining spring 52 (Figure 5).

It is noted that when the chassis 20 is manually moved from its position illustrated in Figure 7 to its position illustrated in Figure 8, the front panel 20A assumes a horizontal position thereby allowing convenient access to the normal bottom side of the chassis 20.

When the chassis 20 is moved from its position illustrated in Figure 8 to its position illustrated in Figure 9 wherein the front roller 27 is supported on the upper side of the channel member 22, the front panel 20A is inclined at an angle of approximately 45° below the horizontal.

It is thus observed that the chassis 20 may be supported on four positions of stable equilibrium on the slide elements 14. While the chassis 20 is manipulated to its various positions as illustrated in Figures 6, 7, 8 and 9, the slide elements 14 are preferably locked in position relative to the cabinet 10, and for that purpose the structure now described in connection with Figure 4 is provided. The slide element 14 is provided with an apertured portion 14A adapted to receive the circular locking pin 60 which is mounted on the lower free end of a cantilever supported strip of spring steel 63. The upper end of such strip 63 is fastened as shown in Figure 4 to the mounting pad 12 while the lower end of such strip 63 has mounted thereon the L-shaped releasing handle 64 to allow convenient automatic releasing or retracting of the locking pin 60 from the locking aperture 14A, said releasing handle being operated by pushing the chassis 20 into the housing 10 (in a normal manner) until chassis 20 pushes release pin 64 out of the way by means of a cam action incorporated into the element 64.

It is observed that this locking arrangement is automatic in the sense that when and as the slide is pulled out of the cabinet, i. e., from its retracted position shown in Figure 6, the locking pin 60, being pressed by the spring strip 63, automatically enters the locking aperture 14A.

Once the slide elements 14 are thus locked with respect to the cabinet, such slide elements 14 provide stable supporting elements, and as a matter of fact, it is then relatively easy to manipulate the chassis 20 to a position wherein it may be supported on the free ends of such slides with the panel 20A extending vertically as indicated in Figure 6, but of course, with the entire chassis 20 extended from the cabinet 10.

The slide element 14 illustrated in the modified arrangement as shown in Figure 10 is essentially the same as the slide elements heretofore described with, however, one essential difference, such difference residing in the manner in which the previously mentioned trackway 47 is defined. In Figure 10, such trackway or guideway 47, comprises generally a 45° angle extending slotted portion in the 45° angle bracket 130. In such case, as in the previously described arrangement, the angle brackets 130 and 47, as the case may be, each serve an additional function, namely as stop members for limiting lateral movement of the box-shaped chassis 20.

Figures 11, 12:
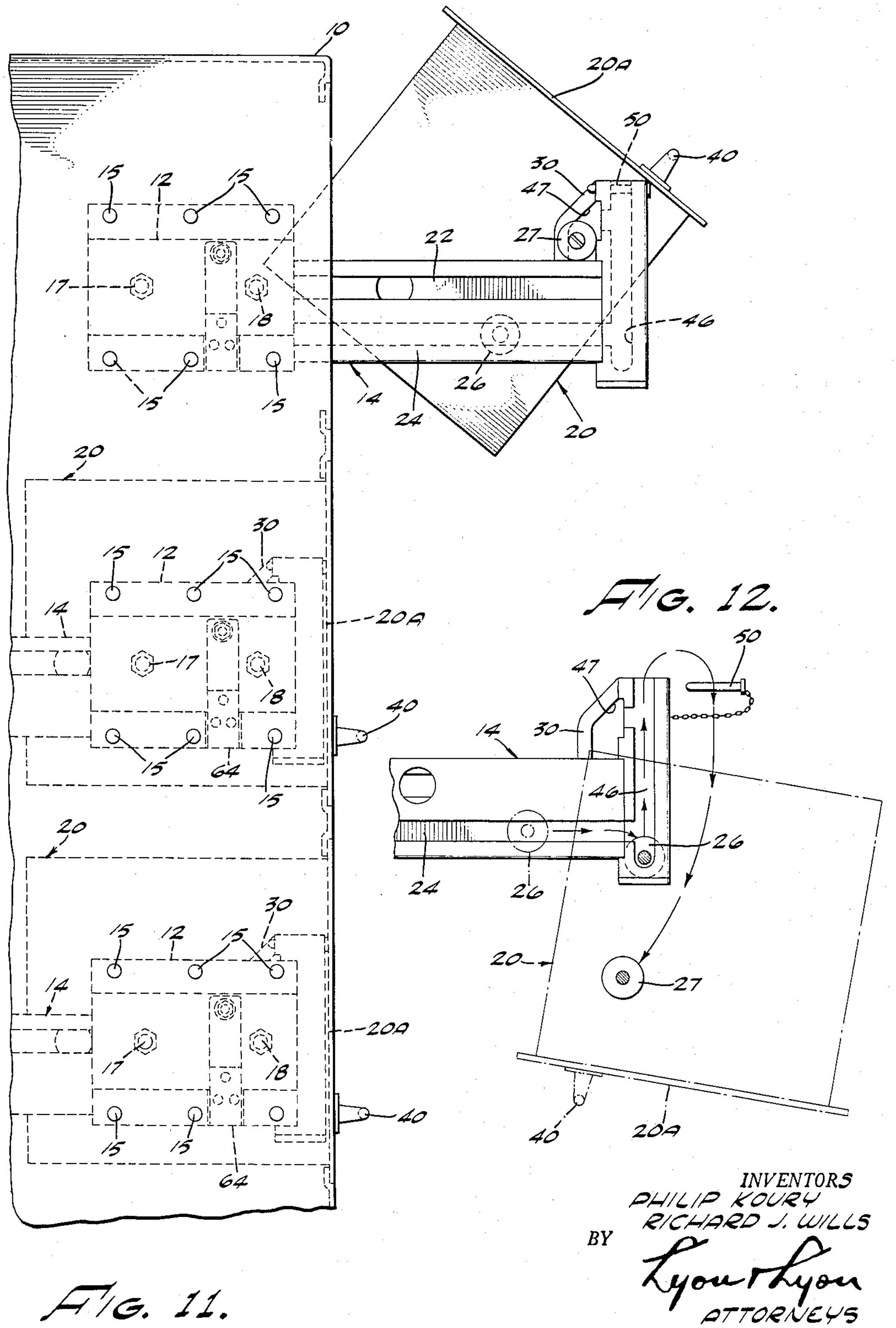
Figure 11 shows a view in side elevation of a cabinet mounting three slots embodying the features of the present invention with one of the slots moved to extended position and with the component mounted thereon in a different position than that shown in the preceding drawings.
Figure 12 illustrates another position in which the chassis may be positioned.

Figure 11 illustrates an additional position of stable equilibrium of the chassis where the roller 26 is engaged in the trackway 24 and the roller 27 is engaged in the trackway 47. This places the chassis 20 in a position 45 degrees above the horizontal. This allows access to the underside of the chassis wherein said chassis is one of a number of electronic, radar or radio chassis installed in a vertical rack as shown in Figure 11.

Figure 12 shows still another position of stable equilibrium in which the chassis may be positioned. The position shown in Figure 12 is achieved by removing the clevis pin 50, removing one roller, i. e., the top roller on each side and revolving the unit through a 180 degree arc with the roller 26 still held in position in the trackway 46. This allows the chassis 20 to be suspended below the level of the opening of the cabinet 10, allowing free access to the interior of the cabinet without the necessity of disconnecting any cables or harnesses attached between the chassis 20 and the case 10.

It is noted that in each position, particularly as shown in Figures 2, 3, 7 and 9, and the vertical position, there is positive locking of the chassis with respect to the slides and cabinet, occasioned by the relative positioning of the rollers. This feature is considered important, since persons working with the equipment are prevented from being injured due to relative movement of the chassis once it is positioned in one of the positions illustrated.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In an arrangement of the character described, an elongated member having an upper and a lower horizontally extending channel opening in opposite directions, said upper and lower channels serving as trackways, a mounting element, a roller rotatably supported on said mounting member and disposed within said upper trackway, a component having at least one roller, said component roller being disposed in said lower trackway, a vertically extending trackway for said component roller in communication with said lower trackway, said vertically extending trackway extending below said lower trackway, said vertical trackway extending above said upper trackway, said vertical trackway having an opening therein above said upper trackway to allow said component roller to be withdrawn from said vertical trackway and to be lowered onto said upper trackway.

2. In an arrangement of the character described, a slide element comprising an elongated member having a pair of channel members disposed in side-by-side relationship but said channel members having their openings directed in opposite directions, a mounting member, a roller on said mounting member and disposed within one of said channels, a component, at least one roller rotatably supported on said component, and said component roller being disposed in the other one of said channels, a vertical channel member being in communication with said other channel, said other channel and said vertical channel members serving as a trackway for said component roller, said vertical channel member extends above both said other channel member and said one channel member and has an opening in the side thereof, to allow said component roller to be removed from said vertical channel member and to be lowered onto said one channel member.

3. In an arrangement of the character described, a slide element comprising an elongated member having a pair of channel members disposed in side-by-side relationship but said channel members having their openings directed in opposite directions, a mounting member, a roller on said mounting member and disposed within one of said channels, a component, at least one roller rotatably supported on said component, and said component roller being disposed in the other one of said channels, a vertical channel member being in communication with said other channel, said other channel and said vertical channel members serving as a trackway for said component roller, said vertical channel member has mounted thereon near its upper end, a releasable roller-retaining elment which may be removed to allow said component roller and said component to be withdrawn completely from said vertical channel member.

4. In an arrangement of the character described, a slide element comprising an elongated member having a pair of channel members disposed in side-by-side relationship but said channel members having their openings directed in opposite directions, a mounting member, a roller on said mounting member and disposed within one of said channels, a component, at least one roller rotatably supported on said component, and said component roller being disposed in the other one of said channels, a vertical channel member being in communication with said other channel, said other channel and said vertical channel members serving as a trackway for said component roller, said vertical channel member is in communication with an inclined channel member, said inclined channel member being inclined downwardly in the direction of said other channel member.

5. In an arrangement of the character described, a slide element comprising an elongated member, said member having a flanged upper channel forming a trackway, said member having a lower flanged channel forming a lower trackway, a mounting element with rollers supported thereon, said rollers being disposed in said upper trackway, a component with rollers thereon, said component rollers being disposed in said lower trackway, said lower trackway being in communication with a vertically extending trackway unitarily formed with said member, a removable stop member on the upper end of said vertically extending trackway, said lower trackway and said vertically extending trackway being adapted to receive said component rollers, and said stop member when removed, allowing said component to be withdrawn from engagement with said member.

References Cited in the file of this patent

UNITED STATES PATENTS

| | | |
|---|---|---|
| 290,497 | Tucker | Dec. 18, 1883 |
| 1,406,129 | Woltz | Feb. 7, 1922 |
| 2,069,707 | Herman | Feb. 2, 1937 |
| 2,486,764 | Singer | Nov. 1, 1949 |
| 2,547,083 | Lundgren | Apr. 3, 1951 |
| 2,630,364 | Gleason | Mar. 3, 1953 |